United States Patent Office 3,423,169
Patented Jan. 21, 1969

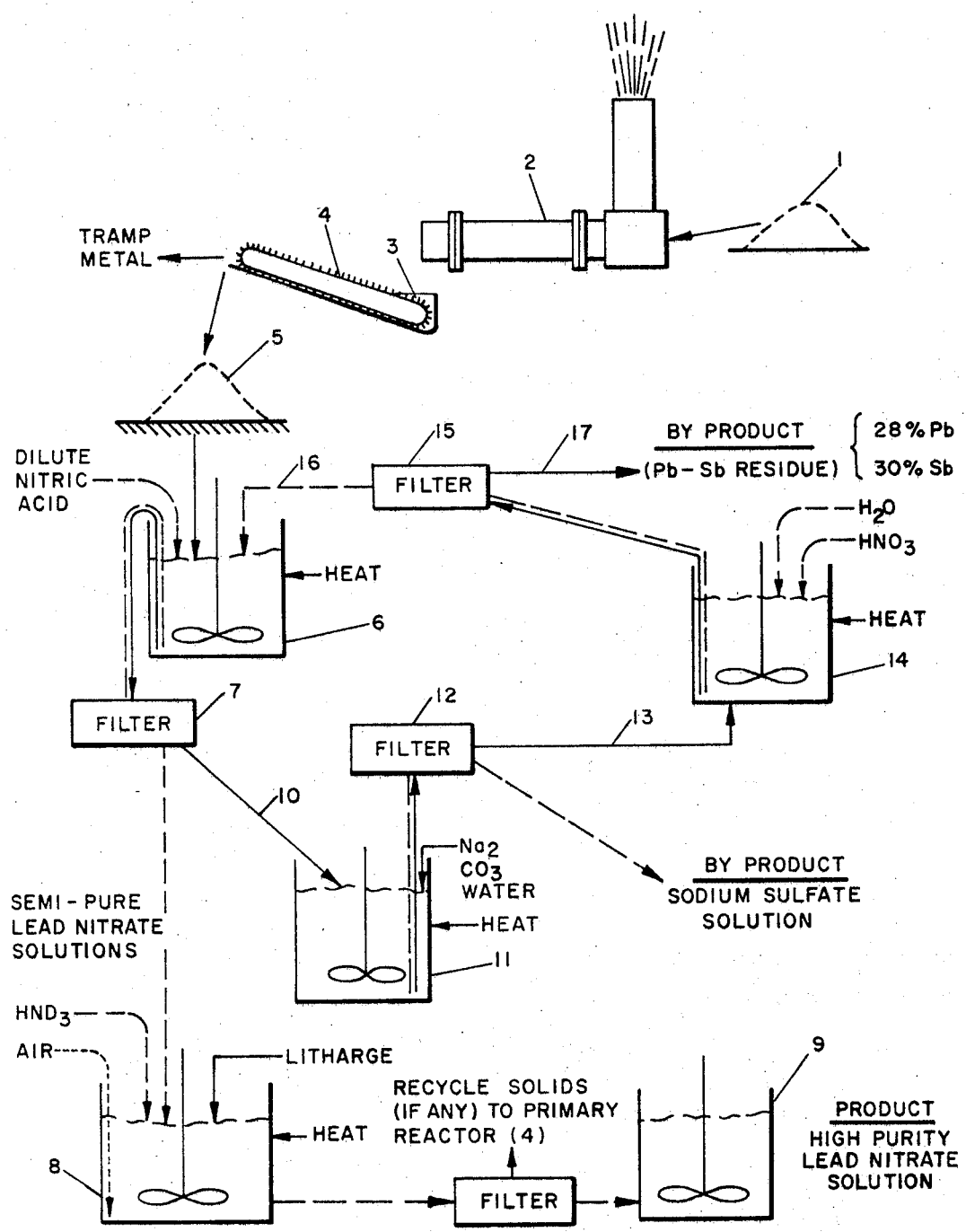

3,423,169
PRODUCTION OF LEAD NITRATE
Alfred E. Van Wirt, Glen Falls, N.Y., assignor to Hercules Incorporated, Wilmington, Del., a corporation of Delaware
Continuation-in-part of application Ser. No. 515,769, Oct. 4, 1965. This application Dec. 18, 1967, Ser. No. 691,328
U.S. Cl. 23—102    1 Claim
Int. Cl. C01g 21/18

ABSTRACT OF THE DISCLOSURE

Copper, aluminum, antimony and iron impurities are precipitated from impure lead nitrate solutions with basic lead complexes which are the pre-reaction or in situ reaction products of lead nitrate and lead metal or lead oxide.

---

This application is a continuation-in-part of application Ser. No. 515,769, filed Oct. 4, 1965, now abandoned, which, in turn, is a division of application Ser. No. 161,567, filed Dec. 22, 1961, now U.S. Patent No. 3,239,308.

This invention relates to an economic process for the manufacture of high purity lead nitrate solutions from impure, inexpensive lead sources such as scrap storage battery plates.

Conventional methods of high purity lead nitrate production involve either the use of expensive, purified lead sources such as pig lead, litharge, basic lead carbonate, etc., or miscellaneous purification techniques such as crystallization. This invention permits a highly efficient conversion of the lead values of inexpensive, impure lead sources to lead nitrate solutions and the purification of these solutions.

One of the earliest methods suggested for recovering the lead values from scrap lead sulfate-containing waste involves a digestion treatment with a sodium carbonate (soda ash) solution for conversion of the lead sulfate to lead carbonate. Under normal conditions this reaction is relatively inefficient, slow and yields a rather difficult-filtering product slurry. One of the features of this invention is the production and separation of a lead sulfate-containing slurry that will react, in good yield, almost instantly with sodium carbonate, producing a relatively easy-filtering product slurry.

A principal object of the present invention is the production of low cost, high purity lead nitrate solutions and/or crystals from impure, inexpensive lead sources such as battery scrap.

Another object of the invention is to effect maximum recovery efficiency to the lead nitrate product with minimum cost and processing.

These and other objects and advantages of the invention will become apparent from the following description of preferred embodiments of the invention.

In accordance with the present invention, it has now been discovered that battery scrap and other sources of secondary lead can be furnaced under certain conditions to yield a product free of organics, easily handled or stored whose lead values consist essentially of lead monoxide, lead sulfate, lead sulfide, and metallic lead, and which reacts readily with nitric acid to produce lead nitrate and very reactive lead sulfate.

It has also been found that relatively nonreactive lead sulfate-containing waste can be furnaced as above with sufficient quantities of lead monoxide or materials which are converted to lead monoxide on proper furnacing to yield a furnace product that will readily react with nitric acid. Reaction products include a lead nitrate solution and a lead sulfate-containing unit residue that reacts rapidly and efficiently with, for example, sodium carbonate solution, to produce an impure lead carbonate which is easily converted to additional lead nitrate.

It has further been discovered that under certain conditions, lead nitrate solutions can be almost completely purified of impurities of aluminum, antimony, iron, and the like. This can be accomplished by reacting the impure lead nitrate solutions with a lead metal and/or lead oxide containing material to produce certain basic lead complexes. Alternatively, these basic lead complexes can be separately formed and then incorporated in the impure lead nitrate solutions. Three basic complexes cause a precipitation of the above-mentioned impurities, probably because they raise the solution pH above the point that the impurities can remain in solution. It is believed that one or both of the following reactions take place:

(1) $2Pb + 2Pb(NO_3)_2 + 2H_2O \rightarrow$
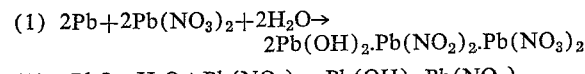
$2Pb(OH)_2 \cdot Pb(NO_2)_2 \cdot Pb(NO_3)_2$ (2) $PbO + H_2O + Pb(NO_3)_2 \rightarrow Pb(OH)_2 \cdot Pb(NO_3)_2$ These equations are intended to explain what may happen without limiting the scope of this invention to these particular reactions. The basic lead complexes are formed in situ or incorporated in amounts sufficient to cause precipitation of the above-mentioned impurities. Upon separation of the precipitated impurities, these basic lead complexes are readily converted to lead nitrate by a simple acid-oxidation treatment. The raising of pH to produce products as described in Reaction 2 can also be accomplished by adding other bases such as alkali or alkaline earth oxides or hydroxides, but these introduce problems of additional cost and solution contamination.

Finally, the additional discovery has been made that impurities such as copper will plate out of the lead nitrate solution onto the surface of particles of certain metals, including lead, under conditions similar to those which are instrumental in producing the above-mentioned basic lead complexes.

In the production of high purity lead nitrate solutions from, for example, scrap storage battery plates, the battery scrap is first calcined or furnaced at temperatures from about 500° F. (the ignition temperature of the combustibles) to about 2000° F. (where excessive volatilization of both lead and antimony occurs) in an oxidizing atmosphere for a period of time sufficient to convert organic matter to a nitric acid-insoluble form. This yields a product, designated herein as "kiln product" whose lead values consist primarily of lead monoxide, lead sulfate, metallic lead and lead sulfide, and whose major impurities include compounds of antimony, aluminum, iron, silicon and copper. The kiln product, formed as described, is reacted with nitric acid, the metallic lead, lead sulfide, and lead monoxide being recovered as high purity lead nitrate solutions and the nitric acid-insoluble lead sulfate portion of the kiln product recovered in a relatively reactable state. The reactability of the lead sulfate recovered in this operation permits a rapid, relatively efficient conversion of same to lead carbonate by sodium carbonate solutions, the lead carbonate then being reacted with nitric acid to ultimately yield additional high purity lead nitrate solutions. Other alkali or alkaline earth oxides, hydroxides, or carbonates may be used in place of sodium carbonate providing they produce water-soluble sulfates when reacted with lead sulfate.

Referring to the accompanying flowsheet for a more detailed description of the invention, battery scrap 1 is burned free of such refuse as rubber, wood, plastic, and so on, in an oxidizing furnace 2 where much of the metallic lead is oxidized, some of the lead sulfate converted to lead sulfide, lead oxide, and lead metal, and essentially all of the various lead oxides decomposed to the monoxide. For this operation the use of a continuous, direct fired rotary kiln is preferred. While this furnace may be operated over a wide range of product temperatures, i.e., from about 500° F. to about 2000° F., it is generally more advantageous, particularly in the case of battery scrap, to operate within a more limited temperature range. Thus, at temperatures of about 1450° F. or below, a rather dusty, heterogeneous material is produced. Between 1450° F. and 1525° F., the furnace product is only semi-molten and somewhat difficult to handle. At temperatures much in excess of 1550° F., the furnace contents become increasingly more corrosive. The preferred product temperature range, therefore, is from about 1525° F. to about 1575° F.

The molten furnace product from 2 is discharged into a water bath 3 where the molten product is solidified and, evidently due to the rapid temperature changes that occur under these conditions, is recovered as a relatively finely divided, very dense, granular material which is removed from the water bath by a conveyor 4 and screened in any suitable manner to remove separable tramp metals. For reference purposes, this material, designated on the flow sheet by the reference numeral 5, is referred to herein as "kiln product."

The primary nitric acid reactor 6, an agitated stainless steel tank, is charged about half full with a nitric acid solution calculated to develop the desired lead nitrate concentration which can be as high as 7 pounds lead nitrate per gallon at 80° C. Any of the various impure lead nitrate solutions discussed in the examples hereinafter given may be added at this point. The reactor contents are controlled at a temperature from about 30° C. to about 90° C. and sufficient kiln product slowly added as necessary to raise the pH of the solution to about 2 while maintaining the temperature within the indicated range. The reaction between nitric acid and the metallic lead, lead sulfide, and lead monoxide content of the kiln product is highly exothermic. Increasing temperature may be controlled by cooling jackets or by reducing the rate of kiln product addition. The reaction temperature has considerable effect on reaction rates and efficiencies. As the temperature is increased, the reaction rate is increased, but an increasing amount of nitric acid is lost due to the evolution of nitrogen oxide gases generated in providing the oxidizing equivalent for the metallic lead content. The optimum temperature for the reaction between nitric acid solutions and kiln product appears to be about 60° C. where a relatively rapid reaction occurs and nitric acid losses are usually at a minimum. Higher temperatures result in a more rapid reaction rate with higher nitric acid losses, while temperatures below 60° C. result in lower nitric acid losses with a slower reaction rate.

When the solution pH has risen to about 2.0, any available filtrate solution consisting of impure lead nitrate may be added for additional treatment. The temperature of the reactor contents should be increased to about 80° C. Little, if any, additional nitric acid will be lost even with the higher temperature at a pH of above 2.0, but when time is of the essence, the temperature may be increased to about 80° C. from pH's as low as about 1.0 with only slight additional loss of nitric acid value. Solution pH should have increased to about 3.7 during the time it took to increase the temperature to about 80° C., but if it did not, additional kiln product should be added to raise the pH to this point. Filtrate samples at this point will have the following average analyses based on a lead nitrate content of 5.5 pounds per gallon.

TABLE 1

| Impurities reported as: | Analyses based on $Pb(NO_3)_2$ Parts per million |
|---|---|
| Aluminum | 500 |
| Antimony | 250 |
| Silicon | 80 |
| Copper | 250 |
| Iron | 10 |

For higher purity an additional amount of kiln product is added amounting to about 1 pound of kiln product per gallon of solution. The reaction is continued to a pH of about 4.0, where filtrate samples will have the following average analyses based on a lead nitrate content of 5.5 pounds per gallon.

TABLE 2

| Impurities reported as: | Analyses based on $Pb(NO_3)_2$ Parts per million |
|---|---|
| Aluminum | 150 |
| Antimony | 110 |
| Silicon | 100 |
| Copper | 100 |
| Iron | 6 |

The above additional kiln product may be added either in a rapid series of charges or may be slowly added throughout the final phases of the reaction. The 80° C. solution temperature recommended above materially increases the rate of this final phase reaction but is not a requisite for reaction completion, as this reaction has been successfully completed at temperatures as low as about 40° C. Under the conditions prevailing in the reactor at the time of the addition of the excess kiln product, the impure lead nitrate solutions react with the lead monoxide and/or lead metal content of the additional kiln product charge producing limited quantities of certain basic lead complexes. At completion of the reaction, the solubility levels of the contaminating compounds of aluminum, antimony, iron, etc., are extremely low, the exact level being controlled by solution pH, temperature, and lead nitrate solution concentration. During this treatment, copper and similar impurities will plate out of solution onto the surface of particles of lead metal present in the kiln product. Upon attaining a solution pH of 4.0, the progress of the final phase of the reaction is followed by analyzing filtrate samples for copper content and measuring the pH. Completion of the reaction is indicated by a copper content of less than 10 parts per million of lead, a solution pH of about 4.2, as measured at room temperature, i.e., at about 25° C., and a deep yellow color in filtrate samples which have the following average analyses based on a lead nitrate content of 5.5 pounds per gallon.

TABLE 3

| Impurities reported as: | Analyses based on $Pb(NO_3)_2$ Parts per million |
|---|---|
| Aluminum | 13 |
| Antimony | 75 |
| Silicon | 180 |
| Copper | 5 |
| Iron | 5 |

The pH of the filtrate, as stated above, will be about 4.2 when measured at room temperature. However, the pH, when measured at the actual temperature of the filtrate, which usually will be above room temperature, can be and probably will be higher, depending upon the degree to which the temperature is elevated above room temperature. The reason for this is that the solubility of the basic lead complexes in the impure lead nitrate solution increases as the temperature is elevated and the increased amount of solute present raises the pH of the solution. However, upon cooling to room temperature, excess basic lead complexes will precipitate from the solution and the pH will return to about 4.2, when measured at room temperature. As a practical matter, from the operational standpoint, the use of slightly elevated temperature prior to the final phases of the reaction is advantageous since it will assure maintenance of the pH at the specified level. In the final phases of the reaction, the impurities such as copper which have plated out of solution are ground or rubbed off the surface of the lead particles and remain in suspension with the lighter insoluble solids.

When tested filtrate samples indicate completion of the final phase of the primary reaction, sufficient water is added to the reactor to dilute filtrate samples to a specific gravity (at 30° C.) of at least 1.45 to prevent crystallization. The degree to which the solution is diluted with water determines to a considerable extent the purity of the final product solution as illustrated by the following analyses.

TABLE 4

| Lead nitrate content, lbs./gal. | 2.0 (p.p.m.) | 3.0 (p.p.m.) | 4.0 (p.p.m.) | 5.5 (p.p.m.) |
|---|---|---|---|---|
| Aluminum | 15 | 15 | 15 | 15 |
| Antimony | 6 | 25 | 40 | 75 |
| Silicon | 70 | 100 | 130 | 180 |
| Copper | 5 | 5 | 5 | 5 |
| Iron | 3 | 3 | 4 | 5 |

It will be noted that as the solutions are diluted the impurity levels are generally decreased. This phenomenon permits a multitude of process alternations that can be so chosen as to roughly control impurity levels of product solutions over a considerable range depending upon the required purity levels and lead nitrate concentrations. If very concentrated, highly pure solutions are required, the solutions are produced very pure by high dilution as per Example 1 hereinafter given, and subsequently concentrated by standard techniques to the desired level or produced as directed by Example 5 hereinafter given and redissolved to the desired concentration. The above-discussed dilution, besides aiding in the precipitation of the various impurities from solutions, prevents the crystallization of lead nitrate on subsequent cooling. At this point the primary reactor 6 contains the slurry which consists of a lead nitrate product solution, suspended insolubles, and considerable amounts of unreacted kiln product.

The agitator is shut off, the very dense particles of unreacted kiln product are permitted to settle to the bottom, and product lead nitrate solution with the less dense suspended insoluble is decanted to a filter 7 for separation. The filtrate and the filter cake wash water are combined in the agitated treating tank 8 where a small amount of impurities can be aged out of solution and the basic lead complexes can be decomposed from the lead nitrate product solution. This aging process is accelerated by cooling and air blowing, preferably a 16-hour, overnight treatment. The basic lead complexes are easily decomposed by slight acidification with nitric acid and a mild oxidation treatment. This oxidation may be an air-blowing operation or a treatment with such compounds as hydrogen peroxide, lead peroxide, etc. The air-blowing operation requires a greater acid excess and higher temperatures than the peroxide treatment but eliminates the expense of the treating agent. Oxidation by air blowing requires a pH of about 2 and temperatures of about 80° C. or higher, while the peroxide treatment requires a pH of only about 3 and temperatures as low as room temperature.

The resulting solution, while relatively free of contaminating elements, contains a minor amount of free nitric acid which can, if desired, be converted to lead nitrate by the addition of sufficient basic lead compounds as litharge (lead monoxide), basic lead carbonate, etc., to attain final solution pH of about 3.7. The treated product solution is cooled, preferably reaged with air blowing and filtered to product storage 9. The separated solids, if any, from this filtration are recharged to the primary reactor 6 for the recovery of any lead content.

The water washed solids 10 from the primary nitric acid reactor filter 7 are charged to an agitated digestor 11 where they are reslurried in a minimum of water, heated to about 50° C. and treated with sufficient sodium carbonate, or other alkali or alkaline earth oxides, hydroxides or carbonates capable of reacting with lead sulfate to produce water-soluble sulfates, to attain a pH of 8.8. Completion of this reaction, which will be further described herein with reference to sodium carbonate, is indicated by a stable pH of 8.8 or higher and sufficient excess sodium carbonate to evolve $CO_2$ gas when a filtrate sample is acidified to a pH of 1.0 with concentrated sulfuric acid. The temperature of this treatment or digestion is relatively unimportant, but a slightly elevated temperature apparently facilitates the dissolving of the sodium carbonate and, to a certain extent, probably increases the reaction rate. In this digestor the lead sulfate content of the primary nitric acid reactor filter cakes is converted to lead carbonate by the following reaction:

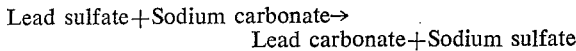
Lead sulfate+Sodium carbonate→
Lead carbonate+Sodium sulfate

This is a well-known reaction for the conversion of lead sulfate-containing materials to the carbonate, but is, reportedly, an inefficient, time-consuming reaction when applied to such materials as the lead sulfate content of scrap storage battery plates (U.S. Patent No. 2,152,242—dated 1939). It has been found that furnacing of the lead sulfate content of battery scrap with the other lead values, as per the previously described furnace operation, will yield a product that will readily react with nitric acid, producing a lead nitrate solution and a highly reactive lead sulfate-containing insoluble material.

The sodium sulfate solution from the above reaction may be discarded or can be processed for the recovery of a high purity sodium sulfate by-product. For efficient lead recovery in subsequent operations, this by-product sodium sulfate solution must be thoroughly separated from the lead carbonate product. This separation can be effected by a tank washing technique or by filtration followed by thorough press washing. The water washed lead carbonate-containing press cake 13 from the filter press 12 is charged into the agitated secondary nitric acid reactor 14 and reslurried in sufficient water to yield a slurry containing about 8 lbs. of solids (dry weight) per gallon.

The resulting slurry is heated to about 60° C. and slowly reacted with nitric acid to a pH of about 2.5. During this reaction large amounts of carbon dioxide gas are liberated and cause considerable foaming. For this reason, the nitric acid addition must be carefully controlled to prevent material loss. The elevated temperature assists in helping to control the foaming, probably by decreasing the surface tension of the solution as well as by slightly increasing the rate of reaction. As previously discussed, pH's somewhat below that of the above 2.5 control are permissible; however, the copper impurities removed in the final phases of the primary nitric acid reaction are, apparently, unreacted in the sodium carbonate digestor and are, therefore, present in the lead carbonate slurry as small particles of elemental copper. These copper particles will dissolve in the reacting nitric acid if the pH is permitted to fall to a sufficiently low value. When solution pH reaches 2.5, the temperature is increased to about 80° C. and, as pH gradually increases due to the reaction of small quantities of unreacted lead compounds, small additional amounts of nitric acid are added to hold the pH at about 3.5. When solution pH holds steady at about 3.5 for 10 minutes at a temperature of 80° C., the slurry is diluted until filtrate samples have a specific gravity (at 30° C.) of about 1.45 to prevent crystallization of lead nitrate on subsequent cooling and yet maintain minimum volume of product solutions. The entire tank contents are then pumped to the filter 15.

The filtrate 16, an impure lead nitrate solution, must be purified for use. This purification can be accomplished either by a treatment with kiln product as per the final phases of the primary nitric acid reaction, or it can be added to the primary nitric acid reaction itself, as previously discussed, and be purified with the product from the primary nitric acid reaction. Combining the two lead nitrate solutions in the primary nitric acid reactor 6 and purifying the combined solutions eliminates half the processing and control required to treat the two solutions separately. The nitric acid-insoluble solids separated from the secondary nitric acid reactor 14 are recovered at the filter 15 as a high lead-high antimony final residue 17.

The lead and the antimony analyses of this final residue can be used to estimate the overall efficiency of this process. An efficiently operated process should yield a final residue of material analyzing over 30% by weight antimony and under 30% lead. This residue can be smelted to produce an antimony lead alloy analyzing less than 1% impurities.

Having described the invention, the following examples are given to illustrate specific embodiments thereof.

Example 1

The following procedure was followed:

Step 1.—Scrap storage battery plates were furnaced continuously in a direct-fired, rotary kiln in an oxidizing atmosphere and at a temperature from about 1525° F. to about 1575° F. whereby all combustible material was destroyed and a molten product (about 1575° F.) was produced.

Step 2.—The molten product from Step 1 was quenched in water to obtain a very dense semi-granular product which was screened relatively free of tramp metal. This quenched, screened material will be referred to herein as "kiln product."

Step 3.—Sufficient kiln product was slowly added to a well-agitated, 25% nitric acid solution, maintained at 60° C. to attain a solution pH of about 2.0. Impure lead nitrate solution from Step 14 was also added to the solution tank at this time (as per Step 15).

Step 4.—The temperature of the tank contents was raised to about 80° C. and the reaction continued to a pH of about 3.7.

Step 5.—An additional quantity of kiln product (about 1 lb./gal. of slurry) was rapidly added and the reaction continued to a pH of about 4.0. A filtrate sample was then analyzed for copper content. The reaction was continued until the copper content was less than 10 parts per million of lead, and the pH was about 4.2 (measured at room temperature). Additional kiln product was added as necessary.

Step 6.—The slurry was diluted with water until filtrate samples had a specific gravity (at 30° C.) of about 1.23, the slurry reheated to about 60° C., agitation stopped, and the very dense particles of unreacted kiln product permitted to settle to the bottom.

Step 7.—The lead nitrate solution and suspended solids, predominantly lead sulfate, were decanted to a filter where the lead nitrate solution and the lead sulfate-containing solids were separated.

Step 8.—Clear filtrate from Step 7 was acidified to a pH of about 2.0 with nitric acid, heated above 80° C., and air blown until colorless.

Step 9.—Sufficient lead carbonate (litharge or basic lead carbonate can also be used) was added to adjust the product pH to about 3.7, the product solution cooled to about 40° C., and then filtered to storage.

Step 10.—The filter cakes from Step 7 were reslurried in sufficient water to permit thorough agitation, heated to about 50° C., and sufficient sodium carbonate (soda ash) added to raise the slurry pH to 8.8.

Step 11.—Product slurry from Step 10 was filtered to separate a product, essentially lead carbonate, from by-product sodium sulfate solution. The lead carbonate solids were water-washed until wash water filtrate was virtually free of soluble sulfates.

Step 12.—Filter cakes from Step 11 were reslurried in water to about 7 lbs. of solids per gallon, the slurry heated to about 60° C., and nitric acid added to the agitated slurry slow enough to control foaming from $CO_2$ (carbon dioxide) gas evolution and to keep solution pH from falling below 2.5. (pH's somewhat below the 2.5 control are permissible, but this figure has been chosen so as to minimize the re-solution of copper.) Nitric acid addition was suspended upon attaining a solution pH of 2.5.

Step 13.—The slurry was heated slowly to 80° C. and more nitric acid added to maintain a pH of about 3.5 as the temperature was increased.

Step 14.—When solution temperature had reached 80° C. and pH had held steady at about 3.5 for about 10 minutes, sufficient water was added to a specific gravity (at 30° C.) of about 1.45 on filtrate sample, and the entire tank contents filtered.

Step 15.—Filtrate from Step 14 was added to a subsequent primary nitric acid reactor batch immediately after its completion of Step 3. The introduction of this impure lead nitrate solution to the reaction tank at this point in no way alters procedures for subsequent operations as per Steps 4, 5, etc. (See Step 3.)

Step 16.—Washed filter cakes from Step 14 were smelted to produce an alloy analyzing 99% minimum total lead and antimony.

Lead nitrate product solutions from Step 9 have the following typical analyses based on a lead nitrate content of 2.0 pounds per gallon.

TABLE 5

Analyses based on $Pb(NO_3)_2$

| Impurities reported as: | Parts per million |
|---|---|
| Aluminum | 15 |
| Antimony | 6 |
| Silicon | 70 |
| Copper | 5 |
| Iron | 3 |

The following yields and material consumptions are typical of a carefully controlled process.

TABLE 6

| | | |
|---|---|---|
| Storage battery scrap (analyzing 70% Pb, 2.7% Sb) | pounds | 100 |
| Nitric acid consumption (70% $HNO_3$) | do | 68 |
| Sodium carbonate consumption | do | 12 |
| Litharge consumption | do | 1.2 |
| Fuel oil consumption (for oil fired furnace) | gallon | 0.6 |
| Yield (as lead nitrate) | pounds | 109.9 |
| By-product sodium sulfate (minimum) | do | 12 |
| By-product Lead-antimony residue (typical analysis: 28% Pb, 30% Sb) | do | 9 |
| Typical conversion efficiencies (to the nitrate) | percent | 96.4 |

Example 2

The procedure of Example 1 was followed except that in Step 6 the slurry was diluted with water until filtrate samples had a specific gravity (at 30° C.) of about 1.38. Lead nitrate solutions from Step 9 of Example 2 had the following typical analyses based on a lead nitrate content of 3.0 pounds per gallon.

TABLE 7

Analyses based on Pb(NO$_3$)$_2$

| Impurities reported as: | Parts per million |
|---|---|
| Aluminum | 15 |
| Antimony | 25 |
| Silicon | 100 |
| Copper | 5 |
| Iron | 3 |

The resulting yield and material consumptions for Example 2 are virtually identical to those of Example 1, but the increased solution concentration of Example 2 permits a material reduction in equipment sizes and cost.

Example 3

The procedure of Example 1 was followed except that in Step 6 the slurry was diluted with water until filtrate samples had a specific gravity (at 30° C.) of about 1.45. Lead nitrate product solutions from Step 9, Example 3, had the following typical analyses based on a lead nitrate content of 4.0 pounds per gallon.

TABLE 8

Analyses based on Pb(NO$_3$)$_2$

| Impurities reported as: | Parts per million |
|---|---|
| Aluminum | 15 |
| Antimony | 40 |
| Silicon | 130 |
| Copper | 5 |
| Iron | 4 |

The resulting yields and material consumptions for Example 3 are virtually identical to those of Examples 1 and 2, but the increased solution concentrations of Example 3 permit an additional reduction in equipment sizes and costs.

Example 4

The procedure of Steps 1 through 13 of Example 1 were followed after which the following procedure was used:

Step 4–14.—When solution temperature had reached 80° C. and pH had held constant at about 3.5 for about 10 minutes, about 1 pound kiln product per gallon of slurry was added and the reaction continued to a pH of about 4.0. A filtrate sample was analyzed for copper content and the reaction continued until copper content was less than 10 parts per million of lead, pH was about 4.2 (measured at room temperature), and color of filtrate samples approximated those of finished primary nitric acid reactor batches. (Primary reactor control samples should be taken of the Step 7 filtration.)

Step 4–15—The slurry was diluted with water until filtrate samples had a specific gravity (at 30° C.) of about 1.23, the slurry heated to about 60° C., agitation stopped and the very dense particles of unreacted kiln product permitted to settle to the bottom.

Step 4–16.—Product solution from Step 4–15 with suspended nitric acid insolubles was decanted to a filter for separation, the filtrate acidified to a pH of 2.0 with nitric acid, heated to above 80° C. and air blown until colorless.

Step 4–17.—At this point, add sufficient lead monoxide or basic lead carbonate to adjust product solution pH to about 3.7 if nitric acid-free product is required, cool product solution to about 40° C. and filter to product storage.

Step 4–18.—Washed filter cakes from Step 4–16 constitute a by-product which can either be sold or smelted to produce a lead-antimony alloy containing as much as 45% antimony.

Step 4–19.—The unreacted kiln product which is settled from the lead nitrate slurry in Step 4–15 must be periodically removed. This is accomplished by a slow addition of sufficient 25% nitric acid solution to completely react this material. The resulting acidic slurry is then pumped to the primary nitric acid reaction tank (of Step 3) in place of all or part of the 25% nitric acid charged and processed as per Steps 4, 5, etc.

The lead nitrate product solutions from the common storage tank will have a typical analysis no different from that listed for product solutions under Example 1.

Example 5

Lead nitrate product solution from Example 1 was evaporated to dryness and baked at a temperature of about 175° C. for 1 hour.

The product was then cooled to about 40° C., redissolved in cold water (about 4 pounds per gallon of water) and immediately filtered to storage. This product had the following typical analyses based on a lead nitrate content of 4.0 pounds per gallon.

TABLE 9

Analyses based on Pb(NO$_3$)$_2$

| Impurities reported as: | Parts per million |
|---|---|
| Aluminum | 12 |
| Antimony | 5 |
| Silicon | 50 |
| Copper | 5 |
| Iron | 3 |

Example 6

The procedure in Steps 1–5 of Example 1 was followed.

Step 6–6.—Agitation was stopped, the very dense particles of unreacted kiln product permitted to settle to the bottom, and the lead nitrate solutions and suspended solids, predominantly lead sulfate, decanted to a filter where the lead nitrate solution and the lead sulfate-containing solids were separated.

Step 6–7.—Hot filtrate solution from Step 6–6 was sent to a crystallizer where it was cooled under such conditions as to produce relatively large crystals of lead nitrate. These crystals were centrifuged from the mother liquor, washed virtually free of any finely divided impurity solids by filtered mother liquor, and dried in a rotary drier for sales or storage.

Step 6–8.—The mother liquors from the above operation were acidified with sufficient concentrated nitric acid to maintain the nitrate balance and were charged to the primary nitric acid reactor, replacing the 25% nitric acid solution referred to in Example 1, Step 3, either totally or in part. Water was added as necessary.

Step 6–9.—The procedure of Steps 10 and 11 of Example 1 was followed.

Step 6–10.—The procedure of Steps 12 and 13 of Example 1 was followed except that the filter cakes from (Step 11 of Example 1) were reslurried in water to about 12 pounds of solids per gallon.

Step 6–11.—When solution temperature had reached about 80° C., and pH had held steady at about 3.5 for 10 minutes, the entire tank contents was filtered.

Step 6–12.—The procedure of Steps 15 and 16 of Example 1 was followed.

Lead nitrate product from Example 6 was in the form of high purity lead nitrate crystals, differing from the solutions as produced in other examples.

It will thus be seen that the present invention provides an economical process for the manufacture of high purity lead nitrate solutions from impure, inexpensive lead sources. Since scrap storage batteries are relatively inexpensive and readily available in most areas, they are the preferred lead source for this invention. However, other inexpensive lead sources can be used. In most cases, it would be desirable, for one reason or another, to add these other lead sources to scrap battery plates prior to the furnacing operation. By this method metallic lead contents can be more easily controlled, high reactivity of secondary lead sulfate values can be assured, many materials such as the higher oxides of lead can be converted to a more reactable state, and the previously discussed operating techniques can be adopted virtually without modification.

In some special case it may be desirable to produce lead nitrate by the terms of this invention from nonbattery lead sources. These alternate raw materials should be first tested to determine if the furnacing step is required or advisable. It should then be tested to determine if there is sufficient copper contamination to require its removal. If a copper contamination problem does exist, it must be determined wthether or not the subject lead source contains sufficient quantities of lead metal in the proper form to effect removal of this copper contaminant. Powdered or granular metals such as lead can be added to the primary reactor during the final phase of the reaction, if necessary, to effect this copper removal. The final test of any proposed raw material is a trial run employing the previously discussed techniques to determine lead recovery yields, operating costs, and the quality of lead nitrate product solutions.

The temperature ranges recommended herein are important only in their effect upon reaction rate and nitric acid losses. In describing the process herein, it is stated that slurries were filtered. It will be understood, of course, that any physical operation can be employed which will perform the indicated separation.

What I claim and desire to protect by Letters Patent is:

1. A process for purifying impure lead nitrate solutions containing impurities such as copper, aluminum, antimony and iron which comprises incorporating therewith basic lead complexes corresponding to those formed by reacting said impure lead nitrate solutions with a material selected from the group consisting of lead metal, lead metal-containing materials, lead oxide and lead oxide-containing materials, said basic lead complexes being incorporated in amounts sufficient to adjust the pH of the resulting mixture to about 4.2 (measured at room temperature), thereby causing precipitatin of said impurities, maintaining the mixture at said pH until the copper content of said mixture is less than 10 parts per million parts of lead, adjusting the specific gravity of said mixture to between about 1.23 and about 1.45 when measured at 30° C., and separating the precipitated impurities from said mixture to give a purified lead nitrate solution containing, based on one million parts of lead nitrate, not greater than 15 parts of aluminum, not greater than 40 parts of antimony, not greater than 4 parts of iron and not greater than 5 parts of copper.

References Cited

UNITED STATES PATENTS

| 1,083,910 | 1/1914 | Anderson et al. | 23—102 |
| 2,187,108 | 1/1940 | Barrett et al. | 23—102 |

FOREIGN PATENTS 15,087   11/1907   Great Britain.

OTHER REFERENCES

Thiel et al.; Chem. Abstracts, vol. 19.

EARL C. THOMAS, *Primary Examiner.*

ARTHUR J. GREIF, *Assistant Examiner.*